(12) United States Patent
Gardner et al.

(10) Patent No.: US 8,268,910 B2
(45) Date of Patent: Sep. 18, 2012

(54) NON-IONIC SURFACTANT ADDITIVES FOR IMPROVED PARTICLE STABILITY IN HIGH ORGANIC INKJET INKS

(75) Inventors: John M. Gardner, San Diego, CA (US); Radha Sen, San Diego, CA (US); Amiya K. Chatterjee, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 12/808,085

(22) PCT Filed: Dec. 14, 2007

(86) PCT No.: PCT/US2007/087588
§ 371 (c)(1),
(2), (4) Date: Jun. 14, 2010

(87) PCT Pub. No.: WO2009/078852
PCT Pub. Date: Jun. 25, 2009

(65) Prior Publication Data
US 2010/0292372 A1    Nov. 18, 2010

(51) Int. Cl.
*C09D 11/00*    (2006.01)

(52) U.S. Cl. ........ 523/160; 523/161; 524/104; 524/376; 524/109

(58) Field of Classification Search .................. 523/160, 523/161
See application file for complete search history.

(56) References Cited

U.S. PATENT DOCUMENTS

| | | | |
|---|---|---|---|
| 6,019,828 A | 2/2000 | Rehman | |
| 6,147,139 A | 11/2000 | Shaw-Klein et al. | |
| 6,572,226 B2 | 6/2003 | Tyvoll | |
| 6,632,472 B2 | 10/2003 | Louwet et al. | |
| 6,635,693 B2 | 10/2003 | Wang et al. | |
| 6,764,173 B2 | 7/2004 | Chen et al. | |
| 6,881,250 B2 | 4/2005 | Wong et al. | |
| 7,211,129 B2 | 5/2007 | Wheeler et al. | |
| 7,211,130 B1 | 5/2007 | Chevli | |
| 7,223,300 B2 | 5/2007 | Chevli | |
| 2006/0007287 A1 | 1/2006 | Cagle et al. | |

*Primary Examiner* — Doris Lee

(57) ABSTRACT

Inkjet ink compositions and methods for increasing inkjet ink particle stability are disclosed herein. In an embodiment, a latex polymer-containing inkjet ink composition comprises a secondary alcohol ethoxylate and a fluoro-surfactant at a concentration ratio effective to increase particle stability of the inkjet ink composition when the pigment particles are substantially electrostatically dispersed. In another embodiment, an inkjet ink composition comprises a latex dispersion having a conductivity of no more than about 1.5 mS/cm.

28 Claims, 4 Drawing Sheets

NON-IONIC SURFACTANT ADDITIVES FOR IMPROVED PARTICLE STABILITY IN HIGH ORGANIC INKJET INKS

BACKGROUND

Aqueous inkjet pigments with good print durability performance contain large amounts of active materials such as latex polymers or dispersions, solvents, and surfactants. Shelf stability of the pigment particles may be poor when electrostatic repulsion is the predominant active colloid stabilization mechanism. In highly organic environments such as inkjet inks, lack of further stabilization may lead to particle settling, particle growth, or increased ink viscosity. Unstable inks thus may clog the fluidic channels in the print head and decrease the reliability of the printing system, leading to decreased shelf life and increased maintenance of the printing system.

Consequently, there is a need for compositions and methods improving particle stability in highly organic inkjet inks.

BRIEF DESCRIPTION OF THE DRAWINGS

For a detailed description of the preferred embodiments of the invention, reference will now be made to the accompanying drawings in which.

NOTATION AND NOMENCLATURE

Figure 1:
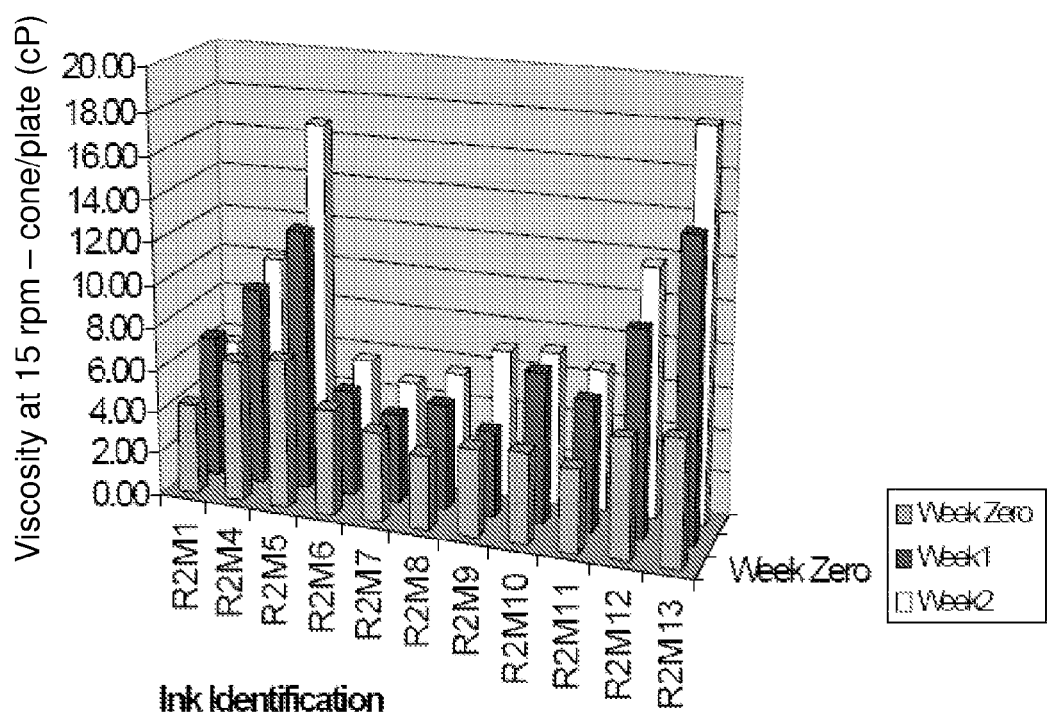
FIG. 1 is a plot of initial viscosity and viscosity increase over time for various inkjet ink compositions.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."

As used herein, the term "nonionic surfactant" may refer to any amphiphilic surface active or wetting agent which does not dissociate in water.

As used herein, the term "inkjet ink" may refer to any liquid solution or dispersion composition which comprises a liquid vehicle and a colorant.

As used herein, the term "colorant" may refer to one or more dyes used in inkjet inks, one or more pigments used in inkjet inks, or combinations thereof.

As used herein, "pigment" refers to a colorant particle which is substantially insoluble in the liquid vehicle in which it is used. Pigments that can be used include self-dispersed pigments and non self-dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a non self-dispersed pigment that utilizes a separate and unattached dispersing agent (which can be a polymer, an oligomer, or a surfactant, for example) in the liquid vehicle or physically coated on the surface of the pigment.

As used herein, the terms "latex" and "latex dispersion" refers to both latex particulates as well as the aqueous medium in which the latex particulates are dispersed. More specifically, a latex is a liquid suspension comprising a liquid (such as water and/or other liquids) and polymeric particulates. Typically, the polymeric particulate can be present in the liquid at a concentration ranging from about 0.5 wt % to about 15 wt %. Such polymeric particulates can comprise a plurality of monomers that are typically randomly polymerized, and can also be crosslinked.

DETAILED DESCRIPTION

Inkjet ink compositions which possess increased particle stability as well as methods of increasing particle stability of inkjet inks are described herein. As a result, shelf life of the compositions may be prolonged. In general, embodiments of the method comprise adding at least two non-ionic surfactants to an inkjet ink composition at a concentration ratio effective to increase particle stability. More particularly, the at least two non-ionic surfactants comprise at least one secondary alcohol ethoxylate and at least one fluoro-surfactant. The combination of a secondary alcohol ethoxylate and a fluoro-surfactant has unexpectedly been found to increase the particle stability of latex-containing inkjet ink compositions. The method may also comprise adding a latex dispersion having a low conductivity to the inkjet ink composition to increase particle stability.

Any inkjet ink composition may be stabilized using the methods and compositions described herein. According to an exemplary embodiment, the inkjet ink composition is a highly organic inkjet ink composition comprising a latex dispersion. In addition, the inkjet ink composition may be substantially electrostatically dispersed. As used herein, the phrase "substantially electrostatically dispersed" refers to inkjet ink compositions in which the pigment particles are dispersed primarily through electrostatic interactions. That is, the inkjet ink compositions do not contain additional components to stabilize the pigment particles. However, "substantially electrostatically dispersed" compositions may be dispersed through other non-additive interactions such as steric or particulate interactions.

The inkjet ink composition may also comprise one or more organic solvents. Examples of organic solvents which may be present in the inkjet ink composition include aliphatic alcohols, aromatic alcohols, diols, glycol ethers, poly(glycol) ethers, caprolactams, lactones, formamides, acetamides, and long chain alcohols. In addition, the organic solvents may include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,5-alcohols of 30 carbons or less, ethylene glycol alkyl ethers, propylene glycol alkyl ethers, poly(ethylene glycol) alkyl ethers, higher homologues of poly(ethylene glycol) alkyl ethers, poly(propylene glycol) alkyl ethers, higher homologues of poly(propylene glycol) alkyl ethers, N-alkyl caprolactams, unsubstituted caprolactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidinone, 2-ethyl-2-hydroxymethyl-1,3-propanediol, diethylene glycol, 3-methoxybutanol, and 1,3-dimethyl-2-imidazolidinone, 3-methyl-1,5-pentanediol, 2-methyl-1,3,-propanediol, 1,3-propanediol, 1,4-butanediol, 2,4-heptanediol, 2-methyl-1,3-pentanediol, 2-methylpentanoic acid, 2-ethyl-3-methyl-1,5-pentanediol, 2-ethyl-1,3-methyl-1,5-pentanediol, 2-ethyl-3-propylacrylic acid, 2-ethyl-hexanoic acid, 3-ethoxyproponic, acid, or combinations thereof.

The solvents may be present in the inkjet ink composition at any concentration. In particular, the concentration of solvents such as 2-pyrrolidinone and its derivatives, may play a role in helping the latex form a durable film on the vinyl media when used in conjunction with at least one secondary alcohol ethoxylate and at least one fluoro-surfactant. More specifically, the weight percent of solvent present in the inkjet ink composition may range from about 2 wt % to about 40 wt %, alternatively from about 5 wt % to about 35 wt %, alternatively from about 10 wt % to about 25 wt %. In an embodiment, the inkjet ink composition may comprise 2-pyrrolidinone or its derivatives in combination with a humectant solvent. In one embodiment, the humectant solvent may be 2-methyl-1,3,-propanediol.

A pigment or any number of pigment blends may be provided in the inkjet ink formulation to impart color to the resulting ink. In one exemplary aspect, the pigment may be any number of desired pigments dispersed throughout the resulting inkjet ink. More particularly, the pigment included in the present inkjet ink may include self-dispersed (surface modified) pigments or electrostatically dispersed pigments.

Suitable pigments that may be included in the inkjet ink can be black pigments, white pigments, cyan pigments, magenta pigments, yellow pigments, or the like. Further, pigments can be organic or inorganic particles as is well known in the art. Suitable inorganic pigments include, for example, carbon black. However, other inorganic pigments may be suitable such as titanium oxide, cobalt blue ($CoO-Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, anthanthrone pigments such as PR168, and the like. Representative examples of phthalocyanine blues and greens include copper phthalocyanine blue, copper phthalocyanine green and derivatives thereof (Pigment Blue 15 and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation.

Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW 18, FW S160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates.

As mentioned above, the inkjet ink compositions may include a number of latex polymer particulates in the form of a latex dispersion. The inclusion of the latex may increase durability of a subsequently formed image. According to one exemplary embodiment, one or more of many different types of polymer dispersions can be used in the present inkjet ink. In addition, latexes specifically adapted for use in ink-jet architecture may be used.

According to one embodiment, a latex dispersion having a low conductivity may be added to the inkjet ink. Generally, salts and other ionic components such as chelating agents or surfactants may be added to inkjet inks to add functionality to the ink, but this can reduce electrostatic particle stabilization. However, it has been found unexpectedly that using a low conductivity latex dispersion increases particle stability of latex containing inkjet ink compositions. As used herein, low conductivity refers to latex dispersions having a conductivity of no more than about 1.5 mS/cm (milliSiemens/centimeters). In alternative embodiments, the latex dispersion may have a conductivity of no more than about 5 mS/cm, alternatively of no more than about 7 mS/cm. Furthermore, the low conductivity latex dispersion may be present or added to the inkjet ink composition at any suitable concentration. More specifically, the low conductivity latex dispersion may be present or added to the inkjet ink composition at a concentration ranging from about 3 wt % to about 9 wt %, alternatively from about 4 wt % to about 8 wt %, alternatively from about 5 wt % to about 7 wt %.

When using a low conductivity latex dispersion, the total conductivity of the inkjet ink composition may be decreased with respect to an ink made from a latex dispersion with moderate to high conductivity. Accordingly, embodiments of the disclosed inkjet ink compositions may have a total conductivity of no more than about 600 µS/cm, alternatively no more than about 500 µS/cm, alternatively no more than about 400 µS/cm.

As mentioned above, embodiments of the disclosed inkjet ink compositions and methods involve the addition or presence of two or more non-ionic surfactants at concentration ratios effective to increase particle stability. Any suitable nonionic surfactants may be added to the inkjet ink. More particularly, examples of suitable surfactants that may be added include alkyl polyethylene oxides, alcohol ethoxylates, nonylyphenyl ethoxylates, acetylenic diols, ethoxylated acetylenic diols, sodium salts of naphthalenesulphonic acid condensation products, or combinations thereof. In an embodiment, the nonionic surfactants comprise at least one secondary alcohol ethoxylate and at least one fluoro-surfactant. The secondary alcohol ethoxylate may have the following formula:

$$C_aH_bO(CH_2CH_2O)_n\text{—}H$$

where a is an integer ranging from 11 to 14, b is an integer ranging from 23 to 31, and n is an integer ranging from 4 to 20. An example of a suitable secondary alcohol ethoxylate is the commercially available Tergitol® series (Dow Chemical) of surfactants including without limitation, Tergitol® 15-s-7, Tergitol® 15-s-9, Tergitol® 15-s-12, Tergitol® 15-s-20, or combinations thereof.

Additionally, the secondary alcohol ethoxylate may be added to the inkjet ink composition at any suitable concentration. Specifically, the secondary alcohol ethoxylate may be added to the inkjet ink at a concentration ranging from about 0.25 wt % to about 2 wt %, alternatively from about 0.35 wt % to about 1 wt %, alternatively from about 0.5 wt % to about 0.75 wt %.

Furthermore, the secondary alcohol ethoxylate may be added in combination with a fluoro-surfactant to increase particle stability of the inkjet ink composition. As used herein, the term "fluoro-surfactant" is any surfactant containing at least one fluorine (F) atom. In an embodiment, the fluoro-surfactant has the following formula:

$$F(CF_2CF_2)_n\text{—}CH_2CH_2\text{—}O\text{—}(CH_2CH_2O)_x\text{—}H$$

where n is an integer ranging from 6 to 12 and x is an integer having a value no more than 20. The fluoro-surfactant may be a commercially available line of surfactants known as Zonyl® FSO (E.I. DuPont de Nemours and Co.)

In another embodiment, the fluoro-surfactant may be a fluorinated polyoxetane-polyester. Hydroxyl terminated polyoxetane prepolymers comprise polymerized repeat units of an oxetane monomer having a pendant —CH$_2$—O—(CH$_2$)$_n$—Rf group prepared from the polymerization of oxetane monomer with fluorinated side chains. These polyoxetanes can be prepared in a manner as set forth herein below, and also according to the teachings of U.S. Pat. Nos. 5,650,483; 5,668,250; 5,688,251; and 5,663,289. The oxetane monomer may have the following structures:

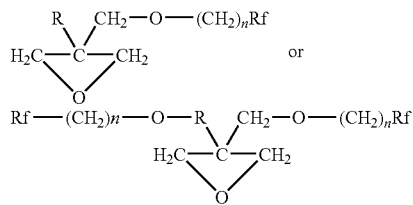

wherein n is an integer from 1 to 5, preferably from 1 to 3, and Rf, independently, on each monomer is a linear or branched, preferably saturated alkyl group of from about 1 to about 20, preferably from about 2 to about 10 carbon atoms with a minimum of 25%, 50%, 75%, 85%, or 95%, or preferably 100% perfluorinated with the H atoms of said Rf being replaced by F, R being H or an alkyl of 1 to 6 carbon atoms. The polyoxetane prepolymer can be an oligomer, a homopolymer, or a copolymer.

The repeating units from said oxetane monomers desirably have the following structure:

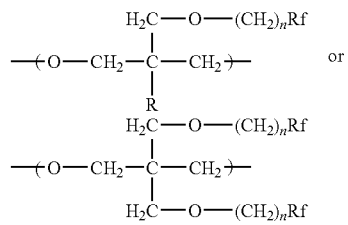

where n, Rf, and R are as described above. The degree of polymerization of the fluorinated oxetane can be from 6 to 100, advantageously from 10 to 50, and preferably 15 to 25 to produce a partially fluorinated polyoxetane prepolymer. The fluorinated polyoxetane-polyester may be obtained commercially as Polyfox® (OMNOVA Solutions, Inc.).

Additionally, the fluoro-surfactants may be added at any suitable concentration. Specifically, the fluoro-surfactants may be added to the inkjet ink at a concentration ranging from about 0.01 wt % to about 2 wt %, alternatively from about 0.2 wt % to about 1 wt %, alternatively from about 0.2 wt % to about 0.5 wt %.

According to one embodiment, at least one secondary alcohol ethoxylate and one fluoro-surfactant may be added to the inkjet ink composition at a concentration ratio effective to increase the particle stability. The secondary alcohol ethoxylate and the fluoro-surfactant may be present in or added to the inkjet ink composition at any appropriate weight ratio. Specifically, the secondary alcohol ethoxylate and the fluoro-surfactant may be present or added to the inkjet ink composition at a concentration ratio ranging from ranging from about 1:10 to about 2:1, alternatively from about 1:4 to about 1:2.

When adding or using a secondary alcohol ethoxylate with a fluoro-surfactant, the total conductivity of the inkjet ink composition may be no more than about 800 µS/cm, alternatively no more than about 700 µS/cm, alternatively no more than about 600 µS/cm.

In other embodiments, a non-ionic surfactant may be used in conjunction with a low conductivity latex dispersion as described above. Specifically, the non-ionic surfactant may be a fluoro-surfactant such as without limitation, Zonyl® FSO. The fluoro-surfactant and the low conductivity latex dispersion may be present or added to the inkjet ink composition at a concentration ratio of fluoro-surfactant to low conductivity latex dispersion ranging from about 1:100 to about 1:5, alternatively ranging from 1:50 to about 1:8, alternatively ranging from about 1:40 to about 1:16.

EXAMPLE 1

Addition of Non-Ionic Surfactants to Enhance Stability

Several different ink samples were tested. Each ink sample contained quantities of one or more nonionic surfactants. Various ink properties of each sample were measured. In particular, the following properties measured: 1) viscosity and viscosity increase over time, 2) viscosity rise per percent of water removed, 3) particle size and particle size increase over time, 4) pH, and 5) surface tension. Table 1 shows the compositions of the different ink samples tested. The percentages shown are all weight percentages.

All experiments were performed at room temperature. Viscosity was measured using a Brookfield cone and plate viscometer at 15 RPM and 60 RPM. Particle size was measured using a dynamic light scattering (on a Nanotrac® machine) and a capillary hydrodynamic fractionator (CHDF). Surface tension was measured using a tensiometer while settling studies were performed with syringes.

Like the results of the viscosity tests above, the Tergitol®-containing samples showed the least viscosity rise out of all the samples. In particular, the Tergitol®-containing samples showed an average viscosity increase of approximately 0.22 cP/% water removed. On the other hand, the control sample had a viscosity increase of 0.29 cP/% water removed.

Figure 4:
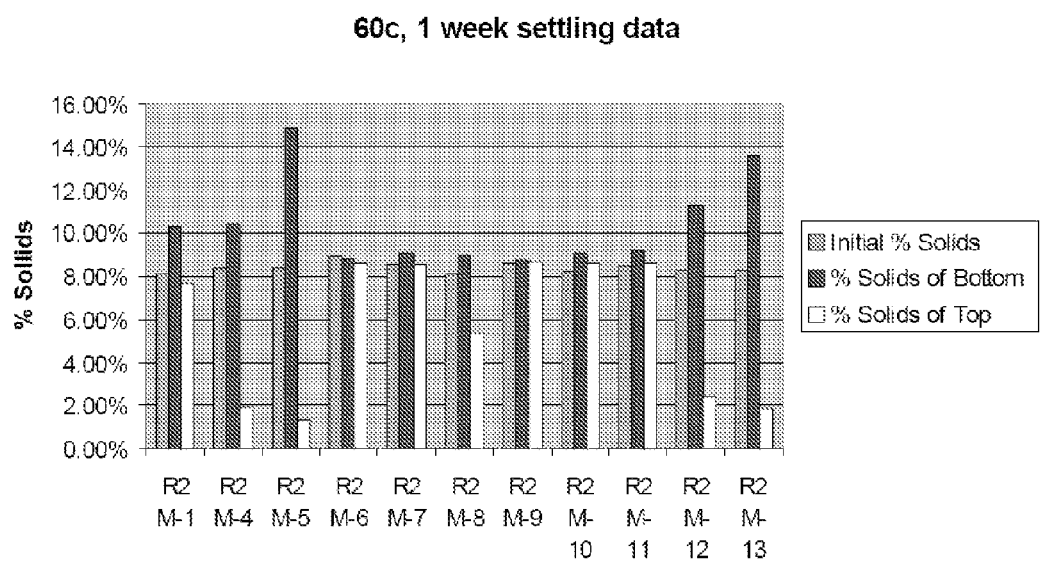
FIG. 4 is a plot of particle settling over time for various inkjet ink compositions.

FIG. 4 shows the results of the ink settling experiments. Ink formulation containing Tergitol® and Zonyl® showed minimal or reduced settling when compared to the control lacking Tergitol® after one week. Specifically, inkjet ink compositions containing Tergitol® had an average of about 8.9% solids at the bottom, compared to controls without Tergitol®

TABLE 1

| Ingredients | Control | R2M-4 | R2M-5 | R2M-6 | R2M-7 | R2M-8 | R2M-9 | R2M-10 | R2M-11 | R2M-12 | R2M-13 | Latex Only |
|---|---|---|---|---|---|---|---|---|---|---|---|---|
| Tergitol 15-s-7 |  |  |  |  |  | 0.25% | 0.50% |  |  |  |  |  |
| Tergitol 15-s-9 |  |  |  | 0.25% | 0.50% |  |  |  |  |  |  |  |
| Surfynol 440 |  |  |  |  |  |  |  | 0.25% | 0.50% |  |  |  |
| Surfynol CT151 |  |  |  |  |  |  |  |  |  | 0.25% | 0.50% |  |
| Cabojet 260M Magenta | 2.50% | 2.50% | 2.50% | 2.50% | 2.50% | 2.50% | 2.50% | 2.50% | 2.50% | 2.50% | 2.50% | 2.50% |
| Tamol 731 A |  | 0.25% | 0.50% |  |  |  |  |  |  |  |  |  |
| Zonyl FSO | 1.00% | 1.00% | 1.00% | 1.00% | 1.00% | 1.00% | 1.00% | 1.00% | 1.00% | 1.00% | 1.00% | 1.00% |
| 2-pyrolidinone | 16.00% | 16.00% | 16.00% | 16.00% | 16.00% | 16.00% | 16.00% | 16.00% | 16.00% | 16.00% | 16.00% | 16.00% |
| Methyl-propanediol | 9.00% | 9.00% | 9.00% | 9.00% | 9.00% | 9.00% | 9.00% | 9.00% | 9.00% | 9.00% | 9.00% | 9.00% |
| Acrylic Latex | 5.00% | 5.00% | 5.00% | 5.00% | 5.00% | 5.00% | 5.00% | 5.00% | 5.00% | 5.00% | 5.00% | 5.00% |

FIG. 1 shows the results of the initial viscosity and viscosity increase experiments over time. Viscosity of the samples was measured at 1 week time intervals for a period of 2 weeks. Samples containing Tergitol® and Zonyl® unexpectedly showed the least amount of viscosity increase as compared to other surfactants such as Tamol® or Surfynol®. Addition of Tergitol® and Zonyl® showed a significant reduction in viscosity increase when compared to controls, which did not contain Tergitol®. In particular, after 1 week, the viscosity of Tergitol® and Zonyl®-containing samples showed a viscosity increase ranging from about 13% to about 30% as compared to an increase of 42% with controls. Moreover, samples with other surfactants actually exacerbated viscosity increase. For instance, samples containing 0.5 wt % Surfynol® CT151 had a viscosity increase of almost 70% after two weeks.

which had about 10.2% solids at the bottom. Samples containing other surfactants showed an increase in solids at the bottom when compared to controls and Tergitol®-containing samples.

EXAMPLE 2

Use of Low Conductivity Latex Dispersions to Enhance Particle Stability

Several different ink samples were tested. The ink samples of interest contained a low conductivity latex dispersion. Viscosity and viscosity increase were measured over a time period of 2 weeks. Table 2 shows the compositions of the different inkjet inks tested. The percentages shown are all weight percentages.

TABLE 2

| Ingredients | JGM-M130 | JGM-M131 | JGM-M132 | JGM-M133 | JGM-M134 | JGM-M135 |
|---|---|---|---|---|---|---|
| Latex (low conductivity) |  | 4.00% |  | 4.00% |  | 4.00% |
| Latex (high conductivity) | 4.00% |  | 4.00% |  | 4.00% |  |
| Cabojet 260M Magenta | 2.50% | 2.50% | 2.50% | 2.50% | 2.50% | 2.50% |
| Zonyl FSO | 0.50% | 0.25% | 0.25% | 0.10% | 0.10% | 0.10% |
| 2-pyrolidinone | 16.00% | 16.00% | 16.00% | 16.00% | 16.00% | 16.00% |
| 2-Methyl1,3-propanediol | 9.00% | 9.00% | 9.00% | 9.00% | 9.00% | 9.00% |

Figure 2:
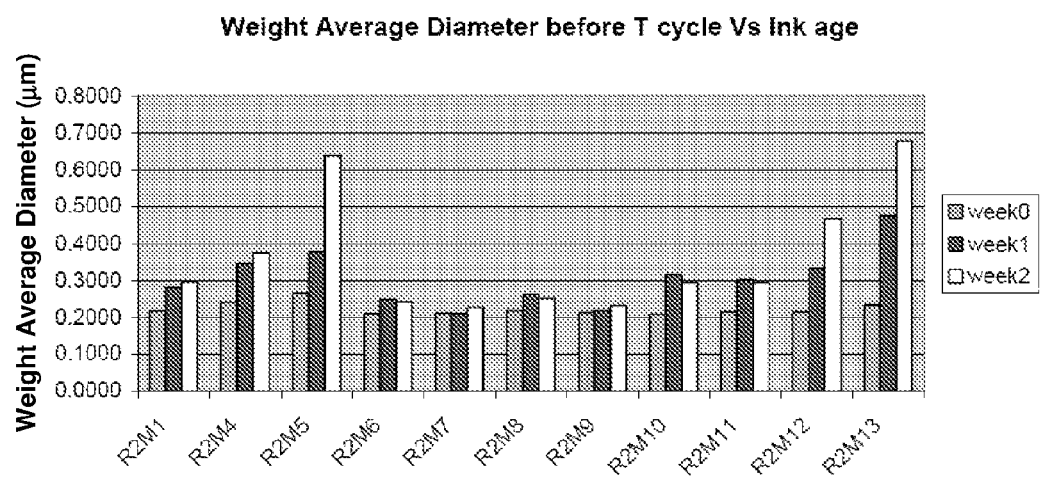
FIG. 2 is a plot of initial particle size and particle size increase over time for various inkjet ink compositions.

FIG. 2 shows the results of the particle size experiments. As with the viscosity experiments, the combination of Tergitol® and Zonyl® yielded excellent reduction of particle size increase in comparison with controls after 2 weeks. Specifically, in all samples containing Tergitol® and Zonyl®, the particle size (as measured by the Nanotrac®) only changed, on average, about 10%. In comparison, the control sample without Tergitol® showed a particle size increase of about 26%.

Figure 3:
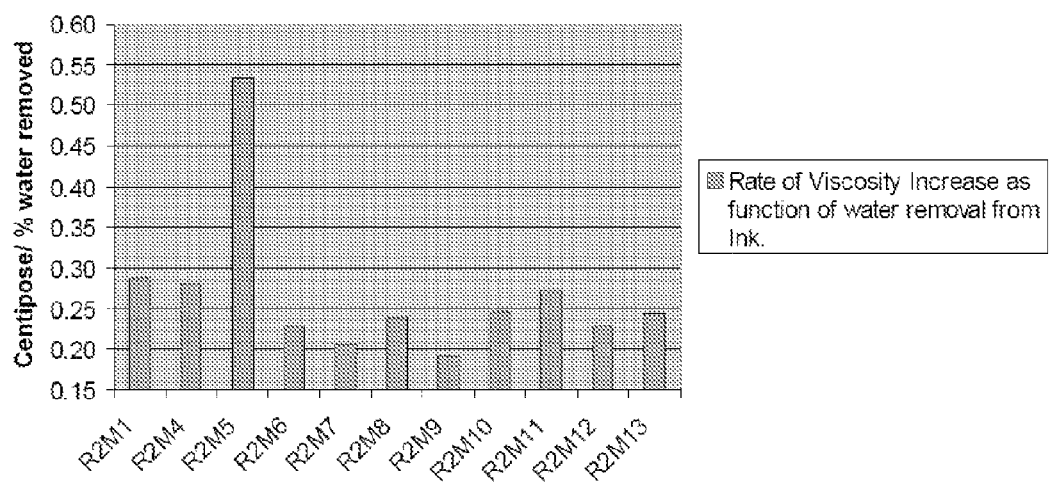
FIG. 3 shows the rate of viscosity increase as a function of water removal for various inkjet ink compositions.

FIG. 3 shows the viscosity rise of the samples as a function of percentage of water removed. In this experiment, approximately 30% less water was used in formulating the inkjet ink samples and then the viscosity of the samples were measured.

Table 3 shows the results of the experiments. The "-" represents samples in which the viscosity was too high to measure by the cone and plate viscometer. Generally, the inkjet ink compositions containing the low conductivity latex dispersion additive showed less increase in viscosity over time compared to compositions having normal conductivities. In fact, in one of the samples containing the low conductivity latex dispersion and 0.1% non-ionic surfactant, the viscosity increased by less than 10%. By comparison, in two of the three samples without the low conductivity latex dispersion, the inkjet ink became so viscous that measurement was no longer possible. Furthermore, the inkjet ink compositions containing the low conductivity latex dispersion additive

TABLE 3

| Sample Number | Viscosity (cP) | | Conductivity (µs/cm) | |
| --- | --- | --- | --- | --- |
| | Week 0 | Week 2 | Week 0 | Week 2 |
| JGM-M130 | 3.42 | 4.77 | 633 | 741 |
| JGM-M131 | 3.5 | 4.15 | 318 | 407 |
| JGM-M132 | 3.32 | — | 616 | 727 |
| JGM-M133 | 3.24 | 5.03 | 308 | 398 |
| JGM-M134 | 3.04 | — | 630 | 736 |
| JGM-M135 | 3.09 | 3.4 | 300 | 392 |

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The discussion of a reference in the Background is not an admission that it is prior art to the present invention, especially any reference that may have a publication date after the priority date of this application.

What is claimed is:

1. An inkjet ink composition comprising:
a secondary alcohol ethoxylate and a fluoro-surfactant at a concentration ratio effective to increase particle stability of the inkjet ink composition, wherein the inkjet ink composition is substantially electrostatically dispersed; and
latex dispersion.

2. The inkjet ink composition of claim 1 wherein the secondary alcohol ethoxylate has the formula:

$$C_aH_bO(CH_2CH_2O)_nH$$

where a is an integer ranging from 11 to 14, b is an integer ranging from 23 to 31, and n is an integer ranging from 4 to 20.

3. The inkjet ink composition of claim 1 wherein the secondary alcohol ethoxylate is present at a concentration ranging from about 0.25 wt % to about 2 wt %.

4. The inkjet ink composition of claim 1 wherein the fluoro-surfactant has the formula:

$$F(CF_2CF_2)_n\text{—}CH_2CH_2\text{—}O\text{—}(CH_2CH_2O)_x\text{—}H$$

where n is an integer ranging from 6 to 12 and x is an integer having a value no more than 20.

5. The inkjet ink composition of claim 1 wherein the fluoro-surfactant is a fluorinated polyoxetane-polyester.

6. The inkjet ink composition of claim 1 wherein the fluoro-surfactant is present at a concentration ranging from about 0.01 wt % to about 2 wt %.

7. The inkjet ink composition of claim 1, further comprising a solvent selected from the group consisting of 2-pyrrolidinone, a 2-pyrrolidinone derivative, a humectant solvent, and combinations thereof.

8. The inkjet ink composition of claim 1 wherein the weight percent ratio of the secondary alcohol ethoxylate to the fluoro-surfactant ranges from about 1:4 to about 1:2.

9. The inkjet ink composition of claim 8 wherein said at least one humectant solvent is 2-methyl-1,3,-propanediol.

10. The inkjet ink composition of claim 8 wherein said solvent is present at concentration ranging from about 10 wt % to about 25 wt %.

11. A method of increasing stability in an inkjet ink composition comprising:
adding a secondary alcohol ethoxylate and a fluoro-surfactant to an inkjet ink composition at a concentration ratio effective to increase particle stability, wherein the inkjet ink composition comprises a latex dispersion and is substantially electrostatically dispersed.

12. The method of claim 11 wherein the secondary alcohol ethoxylate has the formula:

$$C_aH_bO(CH_2CH_2O)_nH$$

where a is an integer ranging from 11 to 14, b is an integer ranging from 23 to 31, and n is an integer ranging from 4 to 20.

13. The method of claim 11 wherein the secondary alcohol ethoxylate is added at a concentration ranging from about 0.25 wt % to about 1 wt %.

14. The method of claim 11 wherein the fluoro-surfactant has the formula:

$$F(CF_2CF_2)_n\text{—}CH_2CH_2\text{—}O\text{—}(CH_2CH_2O)_x\text{—}H$$

where n is an integer ranging from 6 to 12 and x is an integer having a value no more than 20.

15. The method of claim 11 wherein the fluoro-surfactant is a fluorinated polyoxetane-polyester.

16. The method of claim 11 wherein the secondary alcohol ethoxylate to the fluoro-surfactant weight percent ratio ranges from about 1:4 to about 1:2.

17. The method of claim 11, further comprising adding a solvent to the inkjet ink composition, wherein the solvent is selected from the group consisting of 2-pyrrolidinone, a 2-pyrrolidinone derivative, a humectant solvent, and combinations thereof.

18. The method of claim 17, wherein the humectant solvent is 2-methyl-1,3,-propanediol.

19. The method of claim 17, wherein adding the solvent to the inkjet ink composition comprises adding the solvent at a concentration ranging from about 10 wt % to about 25 wt %.

20. An inkjet ink composition comprising a latex dispersion having a conductivity of no more than about 1.5 mS/cm, wherein the inkjet ink composition is substantially electrostatically dispersed.

21. The inkjet ink composition of claim 20 wherein the latex dispersion is present at a concentration ranging from about 4 wt % to about 10 wt %.

22. The inkjet ink composition of claim 20 having a conductivity no more than about 400 µS/cm.

23. The inkjet ink composition of claim 20, further comprising a fluoro-surfactant.

24. The inkjet ink composition of claim 23 wherein the fluoro-surfactant has the formula:

$$F(CF_2CF_2)_n\text{—}CH_2CH_2\text{—}O\text{—}(CH_2CH_2O)_x\text{—}H$$

where n is an integer ranging from 6 to 12 and x is an integer having a value no more than 20.

25. The inkjet ink composition of claim 23 wherein the fluoro-surfactant to latex dispersion concentration ratio ranges from about 1:40 to about 1:16.

26. The inkjet ink composition of claim 23, further comprising a secondary ethoxylate, wherein the secondary alcohol ethoxylate to fluoro-surfactant weight percent ratio ranges from about 1:4 to about 1:2.

27. A method of increasing stability in an inkjet ink composition comprising:
adding a latex dispersion having a conductivity of no more than 1.5 mS/cm to a substantially electrostatically dispersed inkjet ink composition.

28. The method of claim 27 further comprising adding a fluoro-surfactant to the inkjet ink composition.

* * * * *